United States Patent
Yeh

(10) Patent No.: US 9,235,501 B2
(45) Date of Patent: Jan. 12, 2016

(54) MEMORY STORAGE DEVICE, MEMORY CONTROLLER THEREOF, AND METHOD FOR PROGRAMMING DATA THEREOF

(75) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 613 days.

(21) Appl. No.: 13/014,720

(22) Filed: Jan. 27, 2011

(65) Prior Publication Data

US 2012/0151158 A1 Jun. 14, 2012

(30) Foreign Application Priority Data

Dec. 10, 2010 (TW) ................................ 99143380 A

(51) Int. Cl.
*H04N 5/76* (2006.01)
*G06F 12/02* (2006.01)
(52) U.S. Cl.
CPC .................................. *G06F 12/0246* (2013.01)
(58) Field of Classification Search
CPC .. G06F 12/0246; G06F 12/1027; G06F 3/067
USPC ........................................................ 711/103
See application file for complete search history.

(56) References Cited

U.S. PATENT DOCUMENTS

| 7,254,668 B1 * | 8/2007 | Chang et al. ................... 711/103 |
|---|---|---|
| 2005/0286855 A1 * | 12/2005 | Saitou et al. ..................... 386/46 |
| 2009/0172308 A1 * | 7/2009 | Prins et al. ...................... 711/154 |
| 2009/0182939 A1 * | 7/2009 | Hluchyj et al. ................ 711/114 |
| 2010/0005270 A1 * | 1/2010 | Jiang ............................. 711/206 |
| 2010/0049905 A1 * | 2/2010 | Ouchi ............................ 711/103 |
| 2010/0057979 A1 * | 3/2010 | Chu et al. ...................... 711/103 |
| 2010/0082917 A1 | 4/2010 | Yang et al. |
| 2010/0088540 A1 * | 4/2010 | Chu et al. ........................... 714/5 |
| 2010/0161887 A1 * | 6/2010 | Nakazumi ..................... 711/103 |
| 2010/0228885 A1 * | 9/2010 | McDaniel ......................... 710/5 |
| 2011/0072195 A1 * | 3/2011 | Lin ................................ 711/103 |
| 2011/0179217 A1 * | 7/2011 | Hsiao ............................ 711/103 |

FOREIGN PATENT DOCUMENTS

CN 101059752 10/2007

* cited by examiner

*Primary Examiner* — Ryan Bertram
*Assistant Examiner* — Trang Ta
(74) *Attorney, Agent, or Firm* — Jianq Chyun IP Office

(57) ABSTRACT

A memory storage device, a memory controller thereof, and a method for programming data thereof are provided. The memory storage device comprises a rewritable non-volatile memory chip having a plurality of rewritable non-volatile memory modules, and each rewritable non-volatile memory module comprises a plurality of physical blocks. The method includes receiving a write command from a host system, and a logical address corresponding to the write command belongs to a predetermined logical address range. The method also includes determining whether a suitable memory module has not stored any data belonging to the predetermined logical address range exists in all rewritable non-volatile memory modules. The method further includes writing a writing data corresponding to the write command into the suitable memory module if it is existent.

13 Claims, 7 Drawing Sheets

FIG. 5A

MEMORY STORAGE DEVICE, MEMORY CONTROLLER THEREOF, AND METHOD FOR PROGRAMMING DATA THEREOF

CROSS-REFERENCE TO RELATED APPLICATION

This application claims the priority benefit of Taiwan application serial no. 99143380, filed on Dec. 10, 2010. The entirety of the above-mentioned patent application is hereby incorporated by reference herein and made a part of this specification.

BACKGROUND

1. Technology Field

The present invention relates to a method of programming data into a rewritable non-volatile memory chip. More particularly, the present invention relates to a method of programming data into a rewritable non-volatile memory module of a rewritable non-volatile memory chip, and a memory storage device and a memory controller using the same.

2. Description of Related Art

Since a flash memory has advantages of non-volatile, low power consumption, small volume and non-mechanical structure, etc., it is widely used in various electronic devices. More and more portable storage devices such as memory cards or flash drives take the flash memory as a storage medium.

Flash memory chips in some memory storage devices include a plurality of flash memory modules, wherein each of the flash memory modules includes a plurality of physical blocks, and each of the physical blocks includes a plurality of physical pages. In the memory storage devices mentioned above, the physical blocks in all flash memory modules are logically grouped into a plurality of physical units by the memory controller of the memory storage devices to facilitate the management. In addition, the memory controller connects to the flash memory modules through several data input/output buses respectively. Therefore, when the host system is about to access the flash memory chip, the memory controller accesses the physical blocks in one physical unit simultaneously through the data input/output buses.

In this configuration, when the host system is about to write data into the flash memory chip, the memory controller writes data into the corresponding flash memory module according to a logical address corresponding to a host write command. It is assumed that one physical page includes four sectors. If the host system sends three write commands sequentially and respectively, wherein the first write command is about to write data into the logical address corresponding to the zeroth and third physical sectors of the first flash memory module, the second write command is about to write data into the logical address corresponding to the second physical sector of the first flash memory module, and the third write command is about to write data into the logical address corresponding to the first physical sector of the first flash memory module. Since the data to be written requested by these three write commands belong to the same flash memory module, the memory controller writes data corresponding to the three write commands into different physical pages of the first flash memory module sequentially and respectively. When the host system is about to read the foregoing data, the memory controller has to access the first flash memory module for three times to read out the data. In other words, the memory controller has to perform the read operation on the first flash memory module for three times to completely read out the data, and therefore decreases the data reading speed.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data programming method which ensures not to slow down the reading speed while reading the programmed data afterwards.

The present invention is directed to a memory controller, which ensures not to slow down the reading speed while reading the programmed data afterwards.

The present invention is directed to a memory storage device, which ensures not to slow down the reading speed while reading the programmed data afterwards.

The present invention provides a data programming method for a memory storage device having a rewritable non-volatile memory chip. The rewritable non-volatile memory chip includes a plurality of rewritable non-volatile memory modules, and each of the rewritable non-volatile memory modules includes a plurality of physical blocks. The method includes configuring a plurality of logical blocks for mapping to a portion of the physical blocks in the rewritable non-volatile memory modules. The method includes receiving a write command from a host system, wherein a logical address corresponding to the write command belongs to a predetermined logical address range. The method further includes determining whether at least one suitable memory module exists in all rewritable non-volatile memory modules, wherein the at least one suitable memory module has not stored any data belonging to the predetermined logical address range. The method further includes writing a writing data corresponding to the write command into the at least one suitable memory module if the at least one suitable memory module is existent.

According to another aspect of the present invention, the present invention further provides a memory controller for managing a plurality of rewritable non-volatile memory modules, wherein each of the rewritable non-volatile memory modules includes a plurality of physical blocks. The memory controller includes a host interface, a memory interface and a memory management circuit. The host interface is used for coupling to a host system. The memory interface is used for coupling to the rewritable non-volatile memory modules through a plurality of data input/output buses. The memory management circuit is coupled to the host interface and the memory interface, wherein the memory management circuit is used for configuring a plurality of logical blocks for mapping to a portion of the physical blocks in the rewritable non-volatile memory modules. The memory management circuit is further used for receiving a write command from the host system through the host interface, wherein a logical address corresponding to the write command belongs to a predetermined logical address range. The memory management circuit is further used for determining whether at least one suitable memory module exists in the rewritable non-volatile memory modules, wherein the at least one suitable memory module has not stored any data belonging to the predetermined logical address range. The memory management circuit is further used for writing a writing data corresponding to the write command into the at least one suitable memory module if the at least one suitable memory module is existent.

According to another aspect of the present invention, the present invention further provides a memory storage device, and memory storage device includes a rewritable non-volatile memory chip, a memory controller and a connector. The rewritable non-volatile memory chip includes a plurality of rewritable non-volatile memory modules, wherein each of the rewritable non-volatile memory modules includes a plurality of physical blocks. The memory controller is coupled to the rewritable non-volatile memory chip through a plurality of data input/output buses, wherein the memory controller is used for configuring a plurality of logical blocks for mapping to a portion of the physical blocks in the rewritable non-volatile memory modules. The connector is coupled to the memory controller for coupling to a host system. The memory controller is used for receiving a write command from the host system through the connector, wherein a logical address corresponding to the write command belongs to a predetermined logical address range. The memory controller is further used for determining whether at least one suitable memory module exists in the rewritable non-volatile memory modules, wherein the at least one suitable memory module has not stored any data belonging to the predetermined logical address range. The memory controller is further used for writing a writing data corresponding to the write command into the at least one suitable memory module if the at least one suitable memory module is existent.

In light of the foregoing, each time writing data into the rewritable non-volatile memory chip including a plurality of rewritable non-volatile memory modules, the present invention avoids writing data belonging to the same predetermined logical address range into the same rewritable non-volatile memory module as much as possible. Afterwards, when the host system is about to read the sequential data belonging to the same predetermined logical address range, the data can be read from different rewritable non-volatile memory modules so as not to slow down the data reading speed.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIGS. 5A and 5B are exemplary diagrams of managing physical blocks according to an exemplary embodiment of the present invention.

DESCRIPTION OF EMBODIMENTS

Figure 1A:
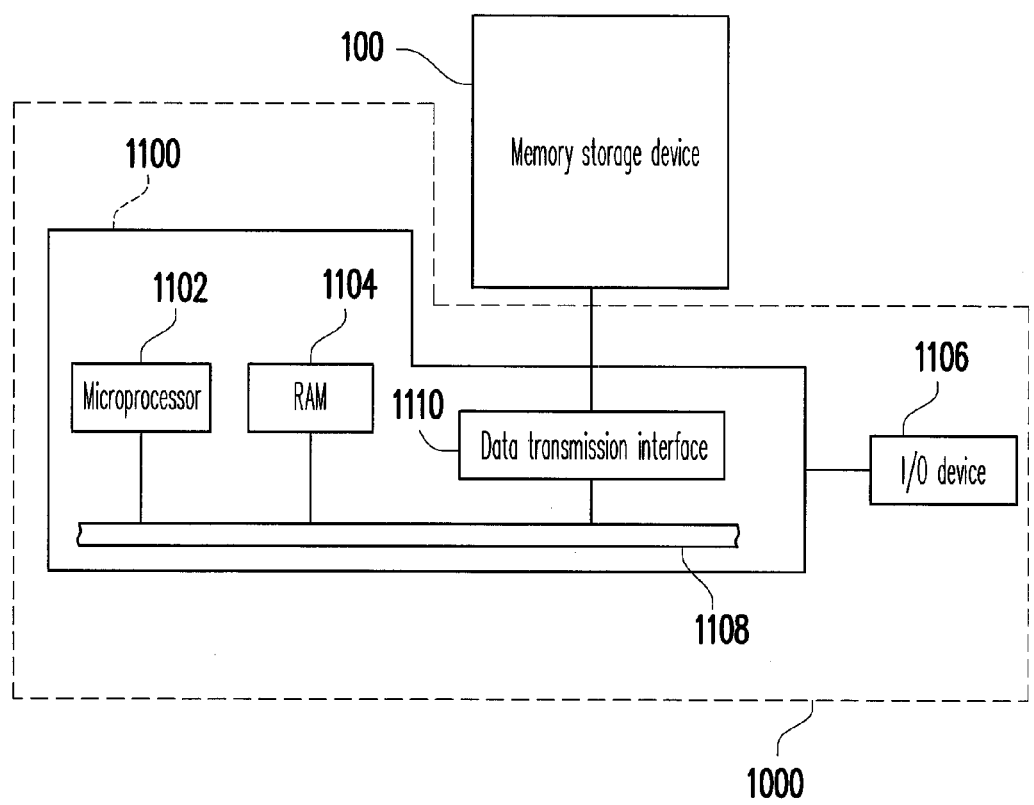
FIG. 1A is a schematic diagram illustrating a host system using a memory storage device according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also referred to as a memory storage system) includes a memory chip and a controller (also referred to as a control circuit). The memory storage device is usually used together with a host system so that the host system can write data into or read data from the memory storage device. In addition, a memory storage device also includes an embedded memory and a software that can be executed by a host system to substantially act as a controller of the embedded memory.

FIG. 1A is a schematic diagram illustrating a host system using a memory storage device according to an exemplary embodiment of the present invention.

Figure 1B:
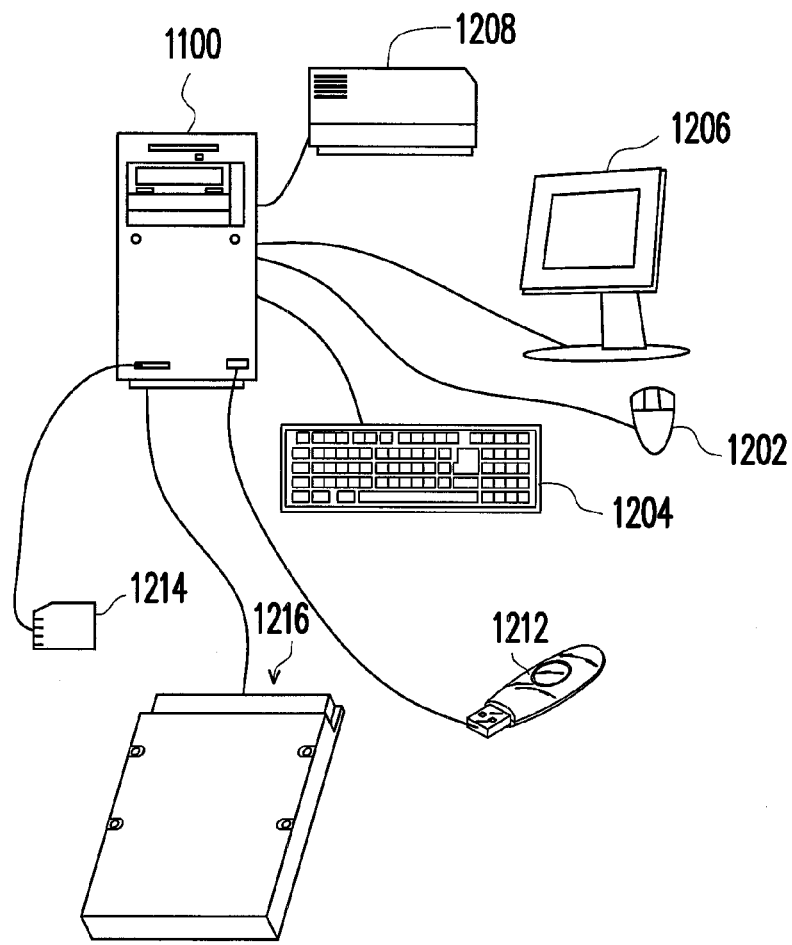
FIG. 1B is a schematic diagram illustrating a computer, an input/output device, and a memory storage device according to an exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208 as shown in FIG. 1B. It should be noticed that the devices shown in FIG. 1B are not used to limit the I/O device 1106; and the I/O device 1106 can further include other devices.

In the exemplary embodiment of the present invention, the memory storage device 100 is coupled to the other devices of the host system 1000 through the data transmission interface 1110. The host system 1000 can write data into or read data from the memory storage device 100 through processing of the microprocessor 1102, the RAM 1104, and the I/O device 1106. For example, the memory storage device 100 can be a memory card 1214, a flash drive 1212 or a solid state drive (SSD) 1216 shown in FIG. 1B.

Figure 1C:
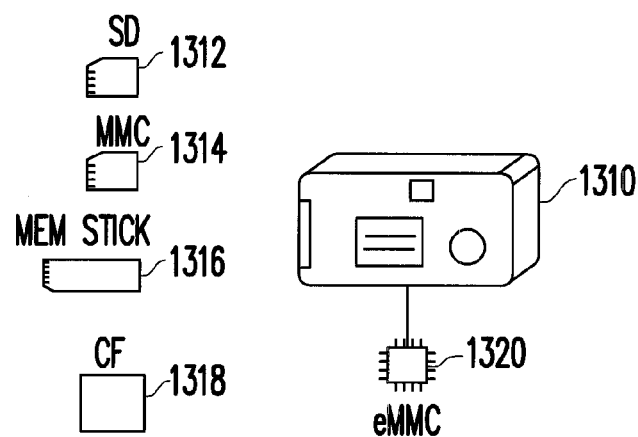
FIG. 1C is a schematic diagram illustrating a host system and a memory storage device according to another exemplary embodiment of the present invention.

Generally, the host system 100 can be any system capable of storing data, though in the present exemplary embodiment, the host system 1000 is assumed to be a computer system for description. However, in another exemplary embodiment of the present invention, the host system 1000 can also be a cell phone, a digital camera, a video camera, a communication device, an audio player or a video player, etc. For example, if the host system is a digital camera 1310, the memory storage device can be a secure digital (SD) card 1312, a multimedia card (MMC) 1314, a memory stick 1316, a compact flash (CF) card 1318 or an embedded storage device 1320 (shown in FIG. 1C). The embedded storage device 1320 includes an embedded MMC (eMMC). It should be noticed that the eMMC is directly coupled to a substrate of the host system.

Figure 2:
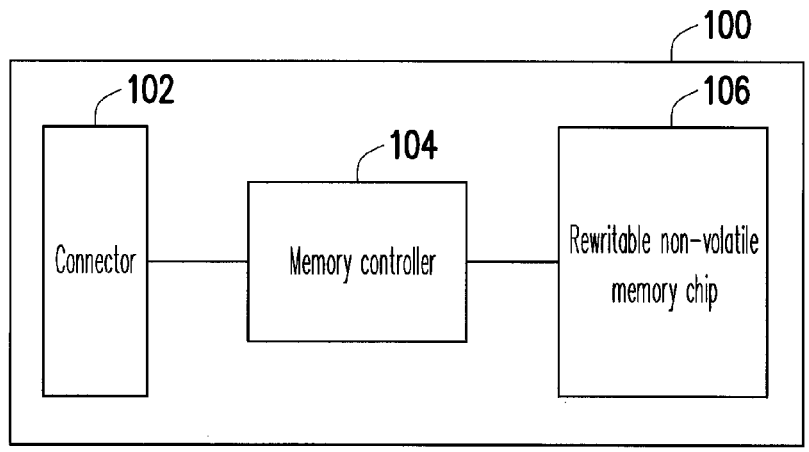
FIG. 2 is a schematic block diagram illustrating a memory storage device of FIG. 1A.

FIG. 2 is a schematic block diagram illustrating a memory storage device 100 of FIG. 1A. Referring to FIG. 2, the memory storage device 100 includes a connector 102, a memory controller 104 and a rewritable non-volatile memory chip 106.

The connector 102 is coupled to the memory controller 104 and is used for coupling to the host system 1000. In the present exemplary embodiment, a type of transmission interface supported by the connector 102 may comply with a serial advanced technology attachment (SATA) interface. However, in the other exemplary embodiments, the transmission interface of the connector 102 may comply with any suitable interfaces such as a universal serial bus (USB) interface, a MMC interface, a parallel advanced technology attachment (PATA) interface, an institute of electrical and electronic engineers (IEEE) 1394 interface, a peripheral component interconnect express (PCI express) interface, a secure digital (SD) interface, a memory stick (MS) interface, a compact flash (CF) interface, or an integrated drive electronics (IDE) interface, etc., which is not limited by the present invention.

The memory controller 104 executes a plurality of logic gates or control instructions implemented in a hardware or firmware form, and performs a program operation, a read operation or an erase operation on the rewritable non-volatile memory chip 106 according to instructions of the host system 1000. Particularly, the memory controller 104 uses a data programming method according to the present exemplary embodiment to determine where the data should be written into when receiving a write command from the host system 1000. The data programming method according to the present exemplary embodiment will be illustrated later on with reference to accompanying drawings.

The rewritable non-volatile memory chip 106 is coupled to the memory controller 104. The rewritable non-volatile memory chip 106 is used for storing system information such as a file allocation table (FAT) or a new technology file system (NTFS), etc., and storing general data such as text files, audio files, video files, and etc. For example, the rewritable non-volatile memory chip 106 is a multi-level cell (MLC) NAND flash memory chip. However, the present invention is not limited thereto. The rewritable non-volatile memory chip 106 may also be a single level cell (SLC) NAND flash memory chip, other flash memory chip or any memory chip having the same characteristic.

Figure 3:
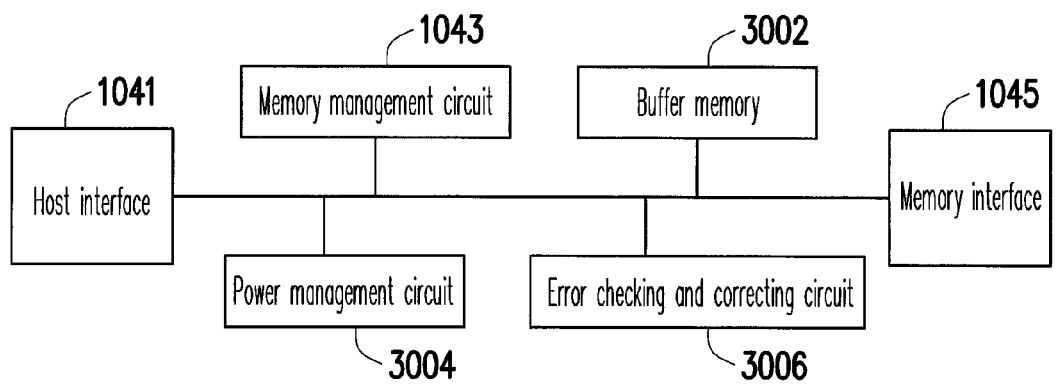
FIG. 3 is a schematic block diagram illustrating a memory controller according to an exemplary embodiment of the present invention.

FIG. 3 is a schematic block diagram illustrating a memory controller according to an exemplary embodiment of the present invention. Referring to FIG. 3, the memory controller 104 includes a host interface 1041, a memory management circuit 1043 and a memory interface 1045.

The host interface 1041 is coupled to the memory management circuit 1043 and configured for coupling to the host system 1000 through the connector 102. The host interface 1041 is used for receiving and recognizing the commands and data sent by the host system 1000. Accordingly, the commands and data sent by the host system 1000 are transmitted to the memory management circuit 1043 through the host interface 1041. In the present exemplary embodiment, the host interface 1041 is, corresponding to the connector 102, a SATA interface, while in the other exemplary embodiments, the host interface 1041 may also be an USB interface, an MMC interface, a PATA interface, an IEEE 1394 interface, a PCI express interface, an SD interface, an MS interface, a CF interface, an IDE interface or an interface complying with any other interface standard.

The memory management circuit 1043 controls the whole operation of the memory controller 104. Specifically, the memory management circuit 1043 has a plurality of control instructions, and when the memory storage device 100 is in operation, the control instructions are executed to accomplish the data programming method according to the present exemplary embodiment.

In the present exemplary embodiment, the control instructions of the memory management circuit 1043 are implemented in a firmware form. For example, the memory management circuit 1043 has a microprocessor unit (not shown) and a read-only memory (ROM, not shown), and the control instructions are burnt into the ROM. When the memory storage device 100 is in operation, the control instructions are executed by the microprocessor unit to accomplish the data programming method according to the present exemplary embodiment.

In another exemplary embodiment of the present invention, the control instructions of the memory management circuit 1043 may be stored in a specific area (for example, the system area in a rewritable non-volatile memory chip 106 exclusively used for storing system data) of the rewritable non-volatile memory chip 106 as program codes. Additionally, the memory management circuit 1043 may have a microprocessor unit (not shown), a ROM (not shown) and a random access memory (RAM, not shown). The ROM has a driver code segment, and when the memory controller 104 is enabled, the microprocessor unit executes the driver code segment to load the control instructions stored in the rewritable non-volatile memory chip 106 into the RAM of the memory management circuit 1043. Then, the microprocessor unit runs these control instructions to execute the data programming method according to the present exemplary embodiment. Additionally, in another exemplary embodiment of the present invention, the control instructions of the memory management circuit 1043 may be implemented in a hardware form.

The memory interface 1045 is coupled to the memory management circuit 1043 and configured to couple the memory controller 104 and the rewritable non-volatile memory chip 106. Accordingly, the memory controller 104 may perform related operations on the rewritable non-volatile memory chip 106. In other words, the data to be written into the non-volatile memory chip 106 are converted, by the memory interface 1045, into a format acceptable to the non-volatile memory chip 106

In an exemplary embodiment of the present invention, the memory controller 104 further includes a buffer memory 3002. The buffer memory 3002 is coupled to the memory management circuit 1043 and configured to temporarily store data from the host system 1000 or from the rewritable non-volatile memory chip 106.

In another exemplary embodiment of the present invention, the memory controller 104 still includes a power management circuit 3004. The power management circuit 3004 is coupled to the memory management circuit 1043 and controls the power supply of the memory storage device 100.

In another exemplary embodiment of the present invention, the memory controller 104 further includes an error checking and correcting (ECC) circuit 3006. The ECC circuit 3006 is coupled to the memory management circuit 1043 and executes an ECC procedure to ensure data accuracy. To be specific, when the memory management circuit 1043 receives a write command from the host system 1000, the ECC circuit 3006 generates a corresponding ECC code for data corresponding to the write command, and the memory management circuit 1043 writes the data corresponding to the write command and the corresponding ECC code into the rewritable non-volatile memory chip 106. Subsequently, when the memory management circuit 1043 reads the data from the rewritable non-volatile memory chip 106, the memory management circuit 1043 also reads the ECC code corresponding to the data, and the ECC circuit 3006 executes the ECC procedure on the data according to the ECC code.

Figure 4:
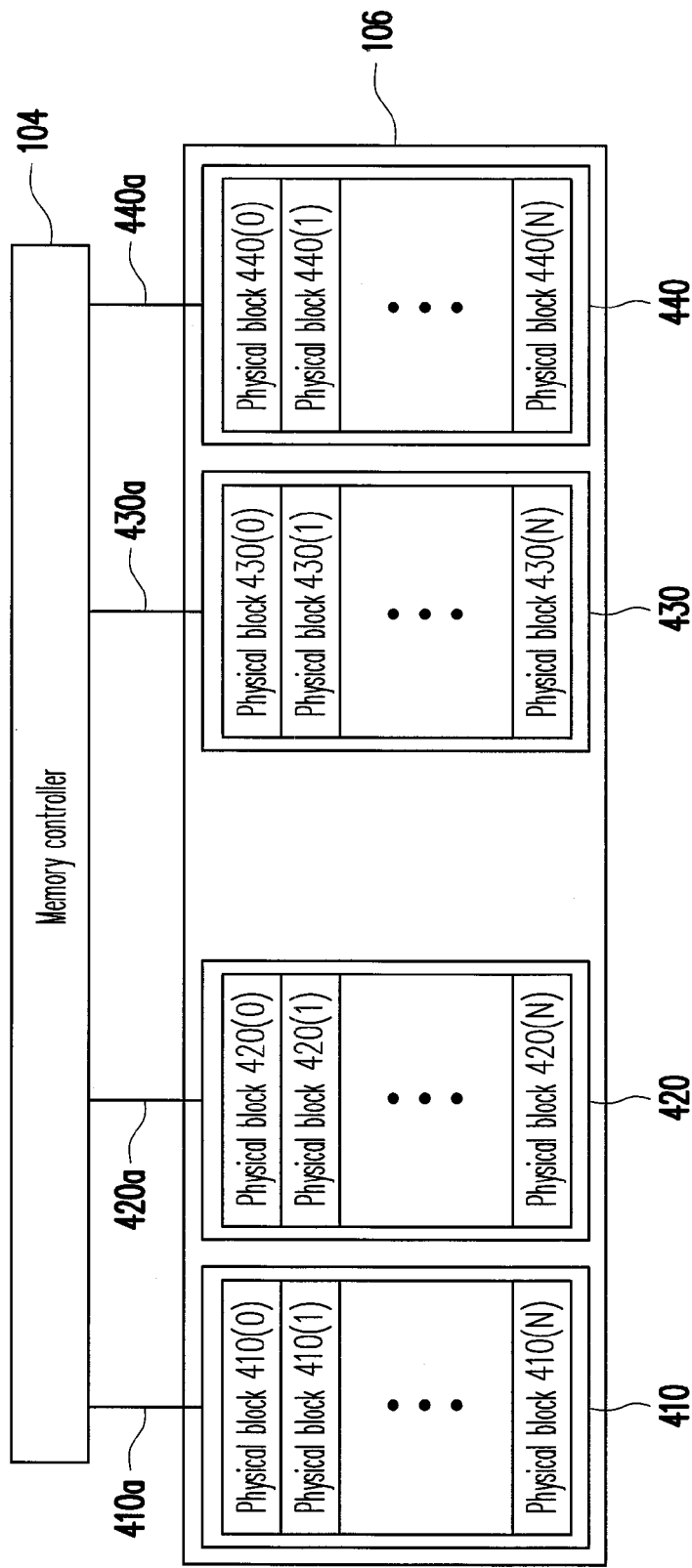
FIG. 4 is a schematic block diagram illustrating a rewritable non-volatile memory chip according to an exemplary embodiment of the present invention.

FIG. 4 is a schematic block diagram illustrating a rewritable non-volatile memory chip according to an exemplary embodiment of the present invention.

Referring to FIG. 4, a rewritable non-volatile memory chip 106 includes a rewritable non-volatile memory module 410, a rewritable non-volatile memory module 420, a rewritable non-volatile memory module 430 and a rewritable non-volatile memory module 440. Each of the rewritable non-volatile memory modules 410 to 440 is coupled to a memory controller 104 through an individual data input/output bus 410a to 440a respectively. However, in another exemplary embodiment of the present invention, the rewritable non-volatile memory modules 410 to 440 may also be coupled to the memory controller 104 merely through one data input/output bus.

The rewritable non-volatile memory module 410 includes a plurality of physical blocks 410(0)~410(N), the rewritable non-volatile memory module 420 includes a plurality of physical blocks 420(0)~420(N), the rewritable non-volatile memory module 430 includes a plurality of physical blocks 430(0)~430(N), and the rewritable non-volatile memory module 440 includes a plurality of physical blocks 440(0)~440(N). Each of the physical blocks in the rewritable non-volatile memory modules 410 to 440 includes a plurality of physical pages, and each of the physical pages has at least one physical sector. In an exemplary embodiment, each physical block has 128 physical pages, and each physical page has 8 physical sectors. For example, assuming that each physical sector is 512 bytes, the capacity of each physical page is 4 kilobyte. However, it should be noticed that the present invention is not limited thereto, each physical block may be composed of 64, 256 or other number physical pages.

Each physical page usually includes a data bit area and a redundant bit area. The data bit area is used for storing user data, and the redundant bit area is used for storing system data (for example, the ECC code).

More specifically, the physical pages belonging to the same physical block can be written individually and can be erased simultaneously. In detail, each physical block is the smallest erasing unit. Namely, each physical block contains the least number of memory cells that are erased together. Furthermore, each physical page is the smallest unit for writing data. However, the present invention is not limited thereto, and in another exemplary embodiment of the present invention, the smallest writing unit may be a physical sector or other size.

In the present exemplary embodiment, when the memory management circuit 1043 executes a write command from the host system 1000, the memory management circuit 1043 simultaneously writes the data in parallel through the data input/output buses 410a to 440a. On the other hand, when the memory management circuit 1043 executes a read command from the host system 1000, the memory management circuit 1043 also simultaneously reads the data in parallel through the data input/output buses 410a to 440a.

It is to be noted that even though the description of this exemplary embodiment is based on the example that the rewritable non-volatile memory chip 106 includes 4 rewritable non-volatile memory modules, but the present invention is not limited thereto. In other words, in another exemplary embodiment of the present invention, the rewritable non-volatile memory chip 106 may include 2 or 8 rewritable non-volatile memory modules.

Figure 5A:
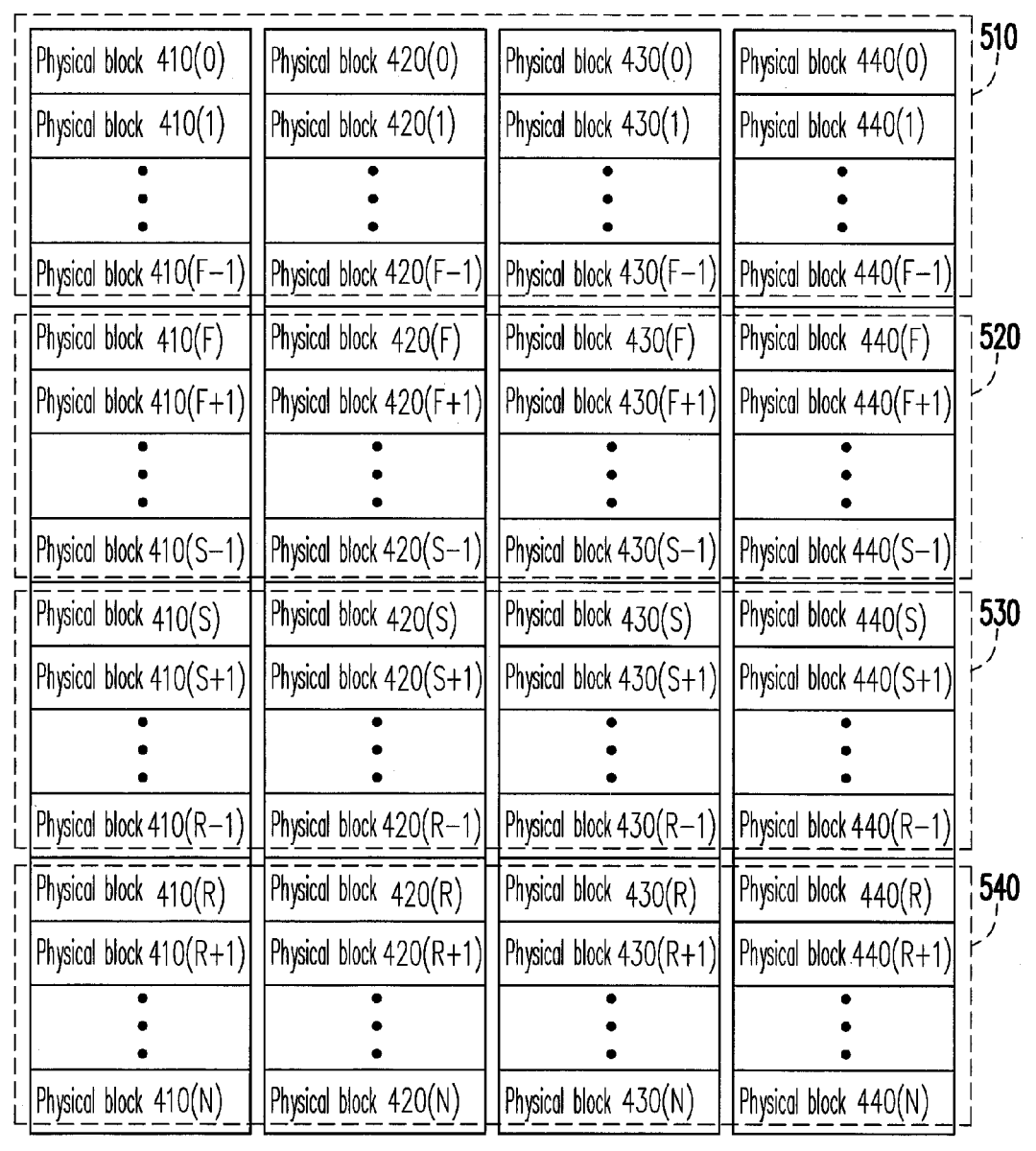
Figure 5B:
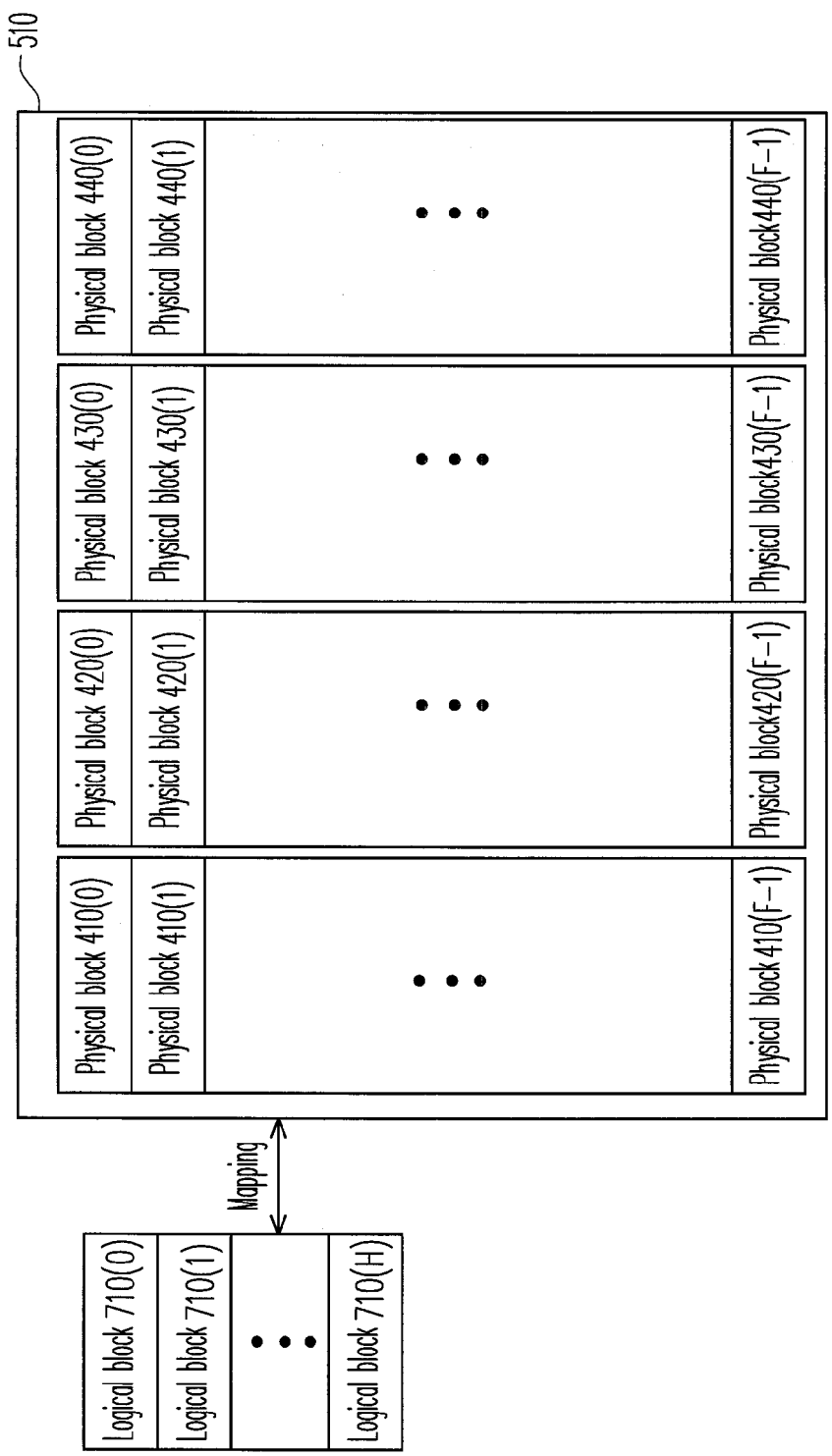

FIGS. 5A and 5B are exemplary diagrams of managing physical blocks according to an exemplary embodiment of the present invention.

Referring to FIG. 5A, the memory management circuit 1043 in the memory controller 104 logically groups the physical blocks 410(0)~410(N), the physical blocks 420(0)~420(N), the physical blocks 430(0)~430(N) and the physical blocks 440(0)~440(N) in the rewritable non-volatile memory modules 410 to 440 into a data area 510, a spare area 520, a system area 530 and a replacement area 540. In FIG. 5A, F, S, R and N are positive integers which represent a number of the physical blocks allocated in each area, and may be varied based on a capacity of the rewritable non-volatile memory chip 106 used by the manufacturer of the memory storage device 100.

The physical blocks logically belonging to the data area 510 and the spare area 520 are used for storing data written by the host system 1000. To be specific, the physical blocks in the data area 510 are physical blocks which have been used for storing data, and the physical blocks in the spare area 520 are physical blocks which are used for substituting the physical blocks in the data area 510. In other words, the physical blocks in the spare area 520 are either blank or available blocks (i.e., no data is recorded in these blocks or data recorded in these blocks is marked as invalid data). Generally, when receiving a write command and the data to be written from the host system 1000, the memory management circuit 1043 selects a physical block from the spare area 520 and writes data into the selected physical block, to substitute the physical blocks in the data area 510.

The physical blocks logically belonging to the system area 530 are used for recording system data. For example, the system data includes information related to the manufacturer and a type of the rewritable non-volatile memory chip 106, a number of the physical blocks in the rewritable non-volatile memory chip 106, and a number of the physical pages in each physical block, and so forth.

The physical blocks logically belonging to the replacement area 540 are used for replacing damaged physical blocks in the data area 510, the spare area 520, or the system area 530. To be specific, if a physical block in the data area 510 is damaged and there are still normal physical blocks in the replacement area 540, the memory management circuit 1043 gets a normal physical block from the replacement area 540 for replacing the damaged physical block. The memory management circuit 1043 gets the normal physical block belonging to the rewritable non-volatile memory module 410 in the replacement area 540 to replace the damaged physical block in the rewritable non-volatile memory module 410, and gets the normal physical block belonging to the rewritable non-volatile memory module 420 in the replacement area 540 to replace the damaged physical block in the rewritable non-volatile memory module 420, and so on.

Referring to FIG. 5B, in the present exemplary embodiment, the memory management circuit 1043 configures a plurality of logical blocks 710(0)~710(H) for mapping to a portion of the physical blocks in the rewritable non-volatile memory modules 410 to 440. In detail, the logical pages included in each logical block are sequentially mapped to the physical pages in the corresponding physical block, and the logical sectors included in each logical page is mapped to the physical sectors in the corresponding physical page. The memory management circuit 1043 provides the configured logical blocks to the host system 1000, and maintains a logical block-physical block mapping table for recoding mapping relationships between the logical blocks 710(0)~710(H) and the physical blocks in the data area 510. Therefore, when the host system 1000 is about to read a logical address, the memory management circuit 1043 converts the logical address into a corresponding logical block, a logical page or a logical sector, and reads data from the physical page of the corresponding physical block according to the logical block-physical block mapping table.

In the present exemplary embodiment, when the host system 1000 sends a write command, the memory management circuit 1043 dispersedly writes the data belonging to the same predetermined logical address range into different rewritable non-volatile memory modules as much as possible.

In detail, each write command sent by the host system 1000 includes sector addresses and a number of the sectors to be written. After the sector addresses and the number of the sectors are converted to the corresponding logical addresses, the memory management circuit 1043 can determine a predetermined logical address range which the logical addresses belong to.

In the case that each logical page has 8 logical sectors, assuming that the predetermined logical address range is a logical page, the logical addresses corresponding to any write command that requires writing data into the logical sectors 0 to 7 belong to the same predetermined logical address range. In an exemplary embodiment, assuming that a first write command sent by the host system 1000 is about to write a first writing data into the zeroth and first logical sectors, and the memory management circuit 1043 writes the first writing data into the rewritable non-volatile memory module 410. Then, if a second write command sent by the host system 1000 is about to write a second writing data into the second and third logical sectors, since the zeroth, first, second and third logical sectors belong to the same logical page (i.e., belong to the same predetermined logical address range), the memory management circuit 1043 writes the second writing data into a rewritable non-volatile memory module other than the rewritable non-volatile memory module 410. For example, the second writing data is written into the rewritable non-volatile memory module 420, the rewritable non-volatile memory module 430 or the rewritable non-volatile memory module 440. It is assumed that the memory management circuit 1043 writes the second writing data into the rewritable non-volatile memory module 420, and if a third write command sent by the host system 1000 is about to write a third writing data into the fourth logical sector. Since the logical address corresponding to the third write command and the logical addresses corresponding to the first and the second write command belong to the same predetermined logical address range (i.e., the zeroth, first, second, third and fourth logical sectors belong to the same logical page), the memory management circuit 1043 writes the third writing data into a rewritable non-volatile memory modules other than the rewritable non-volatile memory modules 410 and 420. In this exemplary embodiment, it is assumed that the memory management circuit 1043 writes the third writing data into the rewritable non-volatile memory module 430.

Thereafter, when the host system 1000 sends a read command corresponding to a logical address of reading data in the zeroth to fourth logical sectors, since the zeroth to fourth logical sectors belong to the same predetermined logical address range (i.e., the same logical page), the corresponding data should be stored in different rewritable non-volatile memory modules as mentioned in the foregoing exemplary embodiment. Accordingly, the memory management circuit 1043 reads the corresponding data respectively from the rewritable non-volatile memory modules 410, 420, and 430 in parallel through the data input/output buses 410*a*, 420*a*, and 430*a*, so as to prevent slowing down the data reading speed caused by reading the same rewritable non-volatile memory module for many times.

In other words, when the host system 1000 sends a plurality of write commands and the logical addresses corresponding to different write commands belong to the same predetermined logical address range, the memory management circuit 1043 writes the writing data corresponding to the write commands into different rewritable non-volatile memory modules dispersedly as much as possible. Accordingly, when the host system 1000 is about to read the said data, it can be avoided that the speed of reading data is slowing down due to access the same rewritable non-volatile memory module for many times.

Below, how the memory management circuit 1043 writes the data belonging to the same predetermined logical address range into different rewritable non-volatile memory modules dispersedly will be described in detail. For the convenience of illustration, it is assumed that the predetermined logical address range is a logical page.

In the present exemplary embodiment, it is assumed that the memory management circuit 1043 receives a write command from the host system 1000 through the host interface 1041, and the logical address corresponding to the write command belongs to a specific logical page. First, the memory management circuit 1043 determines whether any rewritable non-volatile memory module that has not stored the data belonging to the specific logical page exists in the rewritable non-volatile memory modules 410 to 440. The rewritable non-volatile memory module complies with the foregoing condition is referred to as a suitable memory module.

If there is at least one suitable memory module, the memory management circuit 1043 first selects the suitable memory module to store a writing data corresponding to the write command. Specifically, if there are more than one suitable memory module, the memory management circuit 1043 randomly selects one of the suitable memory modules and write the writing data corresponding to the write command into the selected suitable memory module. For example, if only the rewritable non-volatile memory module 410 has stored the data belonging to the specific logical page, the rewritable non-volatile memory modules 420 to 440 are the suitable memory modules. Accordingly, the memory management circuit 1043 selects one of the rewritable non-volatile memory modules 420 to 440 to write the writing data thereinto.

If the memory management circuit 1043 can not find any suitable memory module from the rewritable non-volatile memory modules 410 to 440, it represents that each of the rewritable non-volatile memory modules has stored the data belonging to the specific logical page. Accordingly, the memory management circuit 1043 randomly selects one of the rewritable non-volatile memory modules 410 to 440 to store the writing data. Alternatively, the memory management circuit 1043 selects one rewritable non-volatile memory module which stores least data belonging to the specific logical page among the rewritable non-volatile memory modules 410 to 440 to stores the writing data thereinto. Therefore, it can be avoided that the writing data of a plurality of write commands corresponding to the logical address belonging to the specific logical page are all written into the same rewritable non-volatile memory module. Thereafter, when the host system 1000 sends a read command to read sequential data belonging to the specific logical page, the memory management circuit 1043 reads the corresponding read data in parallel from different rewritable non-volatile memory modules.

In other words, in the case that the predetermined logical address range is a logical page, if the data belonging to a certain logical page has be written into a certain rewritable non-volatile memory module, when the host system 1000 is about to write data belonging to the same logical page, the memory management circuit 1043 writes the data into other rewritable non-volatile memory modules as much as possible. According to the access behavior of the host system 1000, since the host system 1000 often writes small file into the memory storage device 100 repeatedly and then reads out the small files together, through the foregoing method, the data reading speed of the host system 1000 will not be decreased.

It should be particularly noted that even though the foregoing exemplary embodiment takes one logical page as an example of the predetermined logical address range, the present invention is not limited thereto. In other exemplary embodiments, the predetermined logical address range can be a plurality of continuous logical addresses of a specific number, such as logical address 0 to logical address 7.

Figure 6:
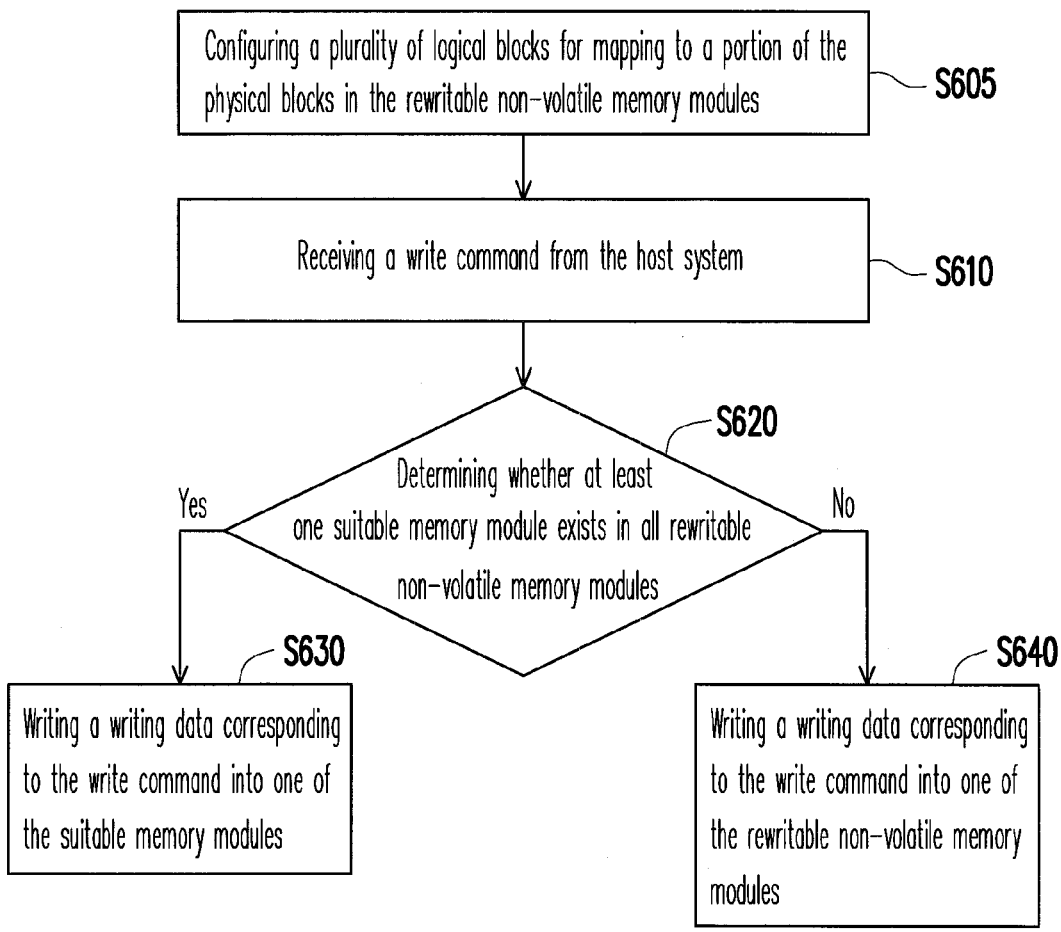
FIG. 6 is a flowchart illustrating a data programming method according to an embodiment of the present invention.

FIG. 6 is a flowchart illustrating a data programming method according to an embodiment of the present invention.

Referring to FIG. 6, in step S605, the memory management circuit 1043 configures a plurality of logical blocks for mapping to a portion of the physical blocks in the rewritable non-volatile memory modules 410 to 440.

In step S610, the memory management circuit 1043 receives a write command from the host system 1000 through the host interface 1041, and a logical address corresponding to the write command belongs to a predetermined logical address range.

In step S620, the memory management circuit 1043 determines whether at least one suitable memory module exists in the rewritable non-volatile memory modules 410 to 440. In detail, the suitable memory module is the rewritable non-volatile memory module which has not stored any data belonging to the predetermined logical address range.

If there is at least one suitable memory module, as shown in step S630, the memory management circuit 1043 selects one of the suitable memory modules and writes a writing data corresponding to the write command into the selected suitable memory module.

If there is no suitable memory module, as shown in step S640, the memory management circuit 1043 randomly writes the writing data into one of the rewritable non-volatile memory modules 410 to 440.

In summary, the present invention provides a memory storage device, a memory controller thereof, and a method for programming data thereof. When processing a write command, the present invention avoids writing data belonging to the same predetermined logical address range into the same rewritable non-volatile memory module as much as possible. Accordingly, when the host system is about to read the sequential data belonging to one predetermined logical address range, the memory controller of the memory storage device reads the data from different rewritable non-volatile memory modules in parallel, so as not to slow down the speed of reading data. The advantages aforementioned not required in all versions of the present invention.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed descriptions.

What is claimed is:

1. A data programming method for a memory storage device having a rewritable non-volatile memory chip, wherein the rewritable non-volatile memory chip comprises a plurality of rewritable non-volatile memory modules, and each of the rewritable non-volatile memory modules includes a plurality of physical blocks, and the data programming method comprising:

configuring a plurality of logical blocks for mapping to a portion of the physical blocks in the rewritable non-volatile memory modules;

receiving a first write command from a host system, wherein a first logical address corresponding to the first write command belongs to a first logical page;

in response to the first write command, determining whether one of the rewritable non-volatile memory modules has stored specific data belonging to said first logical page, and if one of the rewritable non-volatile memory modules has not stored the specific data belonging to said first logical page, serving the one of the rewritable non-volatile memory modules as one of at least one first suitable memory module;

writing a first writing data corresponding to the first write command into a first physical block among the physical blocks located in the at least one first suitable memory module if the at least one first suitable memory module is existent;

after the first write command is received, receiving a second write command from the host system, wherein a second logical address corresponding to the second write command also belongs to said first logical page;

in response to the second write command, determining whether one of the rewritable non-volatile memory modules has stored the specific data belonging to said first logical page, and if one of the rewritable non-volatile memory modules has not stored the specific data belonging to said first logical page, serving the one of the rewritable non-volatile memory modules as one of at least one second suitable memory module; and writing a second writing data corresponding to the second write command into a second physical block among the physical blocks located in the at least one second suitable memory module if the at least one second suitable memory module is existent, wherein the at least one first suitable memory module is different from the at least one second suitable memory module.

2. The data programming method according to claim 1, wherein the step of writing the first writing data corresponding to the first write command into the at least one first suitable memory module comprises:

randomly selecting the at least one first suitable memory module to write the first writing data thereinto.

3. The data programming method according to claim 1, wherein after the step of determining whether one of the rewritable non-volatile memory modules has stored the specific data belonging to said first logical page, the data programming method further comprises:

13 randomly writing the first writing data into one of the rewritable non-volatile memory modules if the at least one first suitable memory module is not existent.

4. The data programming method according to claim 1 further comprising:
receiving a read command from the host system; and
when a logical address corresponding to the read command belongs to said first logical page, reading a corresponding read data respectively from the rewritable non-volatile memory modules.

5. A memory controller for managing a plurality of rewritable non-volatile memory modules, wherein each of the rewritable non-volatile memory modules includes a plurality of physical blocks, and the memory controller comprising:
a host interface, for coupling to a host system;
a memory interface, for coupling to the rewritable non-volatile memory modules through a plurality of data input/output buses; and
a memory management circuit, coupled to the host interface and the memory interface, wherein the memory management circuit is used for configuring a plurality of logical blocks for mapping to a portion of the physical blocks in the rewritable non-volatile memory modules,
the memory management circuit is used for receiving a first write command from the host system through the host interface, and a logical address corresponding to the first write command belongs to a first logical page,
in response to the first write command, the memory management circuit is further used for determining whether one of the rewritable non-volatile memory modules has stored specific data belonging to said first logical page,
if one of the rewritable non-volatile memory modules has not stored the specific data belonging to said first logical page, the memory management circuit is further used for serving the one of the rewritable non-volatile memory modules as one of at least one first suitable memory module,
the memory management circuit is further used for writing a first writing data corresponding to the first write command into a first physical block among the physical blocks located in the at least one first suitable memory module if the at least one first suitable memory module is existent,
the memory management circuit is further used for receiving a second write command from the host system after the first write command is received, wherein a second logical address corresponding to the second write command also belongs to said first logical page,
in response to the second write command, the memory management circuit is further used for determining whether one of the rewritable non-volatile memory modules has stored data belonging to said first logical page,
if one of the rewritable non-volatile memory modules has not stored the specific data belonging to said first logical page, the memory management circuit is further used for serving the one of the rewritable non-volatile memory modules as one of at least one second suitable memory module,
the memory management circuit is further used for writing a second writing data corresponding to the second write command into a second physical block among the physical blocks located in the at least one second suitable memory module if the at least one second suitable memory module is existent,

14 wherein the at least one first suitable memory module is different from the at least one second suitable memory module.

6. The memory controller according to claim 5, wherein the memory management circuit is further used for randomly selecting the at least one first suitable memory module to write the first writing data thereinto.

7. The memory controller according to claim 5, wherein the memory management circuit is further used for randomly writing the first writing data into one of the rewritable non-volatile memory modules if the at least one first suitable memory module is not existent.

8. The memory controller according to claim 5, wherein the memory management circuit is further used for receiving a read command from the host system through the host interface, and reading a corresponding read data respectively from the rewritable non-volatile memory modules when a logical address corresponding to the read command belongs to said first logical page.

9. A memory storage device comprising:
a rewritable non-volatile memory chip, comprising a plurality of rewritable non-volatile memory modules, wherein each of the rewritable non-volatile memory modules includes a plurality of physical blocks;
a memory controller, coupled to the rewritable non-volatile memory chip through a plurality of data input/output buses, wherein the memory controller is used for configuring a plurality of logical blocks for mapping to a portion of the physical blocks in the rewritable non-volatile memory modules; and
a connector, coupled to the memory controller for coupling to a host system,
wherein the memory controller is used for receiving a first write command from the host system through the connector, and a logical address corresponding to the first write command belongs to a first logical page,
in response to the first write command, the memory controller is further used for determining whether one of the rewritable non-volatile memory modules has stored specific data belonging to said first logical page,
if one of the rewritable non-volatile memory modules has not stored the specific data belonging to said first logical page, the memory controller is further used for serving the one of the rewritable non-volatile memory modules as one of at least one first suitable memory module,
the memory controller is further used for writing a first writing data corresponding to the first write command into a first physical block among the physical blocks located in the at least one first suitable memory module if the at least one first suitable memory module is existent,
the memory controller is further used for receiving a second write command from the host system after the first write command is received, wherein a second logical address corresponding to the second write command also belongs to said first logical page,
in response to the second write command, the memory controller is further used for determining whether one of the rewritable non-volatile memory modules has stored the specific data belonging to said first logical page,
if one of the rewritable non-volatile memory modules has not stored the specific data belonging to said first logical page, the memory controller is further used for serving the one of the rewritable non-volatile memory modules as one of at least one second suitable memory module,
the memory controller is further used for writing a second writing data corresponding to the second write command into a second physical block among the physical blocks located in the at least one second suitable memory module if the at least one second suitable memory module is existent,
wherein the at least one first suitable memory module is different from the at least one second suitable memory module.

10. The memory storage device according to claim 9, wherein the memory controller is further used for randomly selecting the at least one first suitable memory module to write the first writing data thereinto.

11. The memory storage device according to claim 9, wherein the memory controller is further used for randomly writing the first writing data into one of the rewritable non-volatile memory modules if the at least one first suitable memory module is not existent.

12. The memory storage device according to claim 9, wherein the memory controller is further used for receiving a read command from the host system through the connector, and reading a corresponding read data respectively from the rewritable non-volatile memory modules when a logical address corresponding to the read command belongs to said first logical page.

13. The memory storage device according to claim 9, wherein the rewritable non-volatile memory chip comprises a multi level cell (MLC) NAND flash memory chip or a single level cell (SLC) NAND flash memory chip.

* * * * *